(12) United States Patent
Mattingly et al.

(10) Patent No.: US 10,600,100 B2
(45) Date of Patent: Mar. 24, 2020

(54) APPARATUS AND METHOD FOR PROVIDING ITEM INTERACTION WITH A VIRTUAL STORE

(71) Applicant: Walmart Apollo, LLC, Bentonville, AR (US)

(72) Inventors: Todd D. Mattingly, Bentonville, AR (US); Nicholas Ray Antel, Winona, MO (US); Robert J. Taylor, Rogers, AR (US); John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 183 days.

(21) Appl. No.: 15/698,092

(22) Filed: Sep. 7, 2017

(65) Prior Publication Data

US 2018/0068368 A1 Mar. 8, 2018

Related U.S. Application Data (60) Provisional application No. 62/384,395, filed on Sep. 7, 2016.

(51) Int. Cl.
*G06Q 30/00* (2012.01)
*G06Q 30/06* (2012.01)
(Continued)

(52) U.S. Cl.
CPC ..... *G06Q 30/0623* (2013.01); *G05B 19/0428* (2013.01); *B65G 1/1378* (2013.01);
(Continued)

(58) Field of Classification Search
None
See application file for complete search history.

(56) References Cited

U.S. PATENT DOCUMENTS

| 3,846,947 A | 11/1974 | Short |
| 5,515,268 A | 5/1996 | Yoda |

(Continued)

FOREIGN PATENT DOCUMENTS

| WO | 2012075589 | 6/2012 |
| WO | 2015164652 | 10/2015 |

OTHER PUBLICATIONS

Hanson, Lydia; "Dressing Rooms of the Future", WhichPLM, http://www.whichplm.com/editorschoice/dressingroomsofthefuture.html, published on Jul. 29, 2015, pp. 1-3.

(Continued)

*Primary Examiner* — Mila Airapetian
(74) *Attorney, Agent, or Firm* — Fitch, Even, Tabin & Flannery LLP (57) ABSTRACT

Systems, apparatuses, and methods are provided herein for store management. A system for store management comprises: a storage system in a backroom area, a conveyor system, a return sensor system, and a control circuit. The control circuit being configured to: receive an interact request from a customer via a user interface device in a showroom area, cause the conveyor system to retrieve one or more items from the storage system and transport the one or more items to the item interaction area based on the interact request, receive a return request, cause the return sensor system to collect data from the at least one item, determine whether to accept the return request based on the data collected by the return sensor system, and cause the conveyor system to retrieve the at least one item from the customer and make the at least one item available for another customer.

19 Claims, 5 Drawing Sheets

(51) Int. Cl.
  *G05B 19/042* (2006.01)
  *B65G 1/137* (2006.01)
  *G05B 19/12* (2006.01)
(52) U.S. Cl.
  CPC .. *G05B 19/124* (2013.01); *G05B 2219/23189* (2013.01); *G05B 2219/2621* (2013.01)

(56) References Cited

U.S. PATENT DOCUMENTS

| | | | |
|---|---|---|---|
| 8,401,914 | B1 | 3/2013 | Kim |
| 9,911,290 | B1* | 3/2018 | Zalewski ............. G07G 1/0072 |
| 2004/0128025 | A1 | 7/2004 | Deal |
| 2005/0063801 | A1 | 3/2005 | Durand |
| 2005/0261977 | A1 | 11/2005 | Kiji |
| 2009/0149985 | A1 | 6/2009 | Chirnomas |
| 2010/0030578 | A1 | 2/2010 | Siddique |
| 2011/0035299 | A1 | 2/2011 | Casey |
| 2012/0029685 | A1* | 2/2012 | Keller ................. G06Q 10/087 700/216 |
| 2012/0029687 | A1 | 2/2012 | Hagen |
| 2012/0239536 | A1 | 9/2012 | Takahashi |
| 2012/0298688 | A1* | 11/2012 | Stiernagle ............... G07F 9/023 221/155 |
| 2013/0110666 | A1 | 5/2013 | Aubrey |
| 2013/0334309 | A1 | 12/2013 | Shouraboura |
| 2014/0052498 | A1* | 2/2014 | Marshall ............ G06Q 30/0635 705/7.35 |
| 2014/0129354 | A1 | 5/2014 | Soon-Shiong |
| 2015/0262117 | A1 | 9/2015 | Li |
| 2015/0302511 | A1* | 10/2015 | Lopez ................ G06Q 30/0635 705/26.81 |
| 2015/0307279 | A1* | 10/2015 | Almada ............. G06Q 30/0635 700/216 |
| 2016/0019717 | A1 | 1/2016 | Yopp |
| 2016/0104220 | A1 | 4/2016 | Stiernagle |
| 2016/0171502 | A1* | 6/2016 | Maenpaa ............. G06Q 20/32 705/44 |
| 2017/0083911 | A1* | 3/2017 | Phillips ................ G06Q 20/065 |

OTHER PUBLICATIONS

Hill, David J.; "High-Tech Clothing Store Hointer Employs Robots and Mobile Tech Instead of Salespeople", SingularityHUB, Feb. 28, 2013, http://singularityhub.com/2013/02/28/high-tech-clothing-store-hointer-employs-robots-and-mobile-technology-instead-of-salespeople/, pp. 1-6.

Imgscrinc; "Puma Store Harajuku Interactive Mirror", https://www.youtube.com/watch?v=_X2-_t5f_IA, published on Mar. 3, 2011, pp. 1-6.

Kinectforwindows; "Kinect for Windows Retail Clothing Scenario Video", https://www.youtube.com/watch?v=Mr71jrkzWq8, published on Oct. 11, 2013, pp. 1-6.

Lu, Clara; "IKEA's inventor management strategy: how does IKEA do it?", Tradegecko, Apr. 23, 2014, https://www.tradegecko.com/blog/ikeas-inventory-management-strategy-ikea, pp. 1-27.

PCT; App. No. PCT/US2017/049256; International Search Report and Written Opinion dated Nov. 16, 2017.

\* cited by examiner

APPARATUS AND METHOD FOR PROVIDING ITEM INTERACTION WITH A VIRTUAL STORE

CROSS-REFERENCE TO RELATED APPLICATION

This application claims the benefit of the following U.S. Provisional Application No. 62/384,395 filed Sep. 7, 2016, which is incorporated herein by reference in its entirety.

TECHNICAL FIELD

This invention relates generally to store management.

BACKGROUND

Traditional brick-and-mortar stores typically place items offered for sale out on the sales floors. In-store customers shop by selecting items off the shelves on the sales floor and bringing items to a checkout counter to make a purchase.

BRIEF DESCRIPTION OF THE DRAWINGS

Disclosed herein are embodiments of apparatuses and methods for store management. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for store management. In some embodiments, a system for store management comprises: a storage system in a backroom area of a retail facility configured to store a plurality of items for sale, a conveyor system configured to transport items from the storage system to an item interaction area in the retail facility, a return sensor system, and a control circuit coupled to the conveyor system and the return sensor system, the control circuit being configured to: receive an interact request from a customer via a user interface device in a showroom area of the retail facility, cause the conveyor system to retrieve one or more items from the storage system and transport the one or more items to the item interaction area based on the interact request, receive a return request for at least one item from the customer, cause the return sensor system to collect data from the at least one item, determine whether to accept the return request based on the data collected by the return sensor system, and in an event that the return request is accepted, cause the conveyor system to retrieve the at least one item from the customer and make the at least one item available for another customer.

Figure 1:
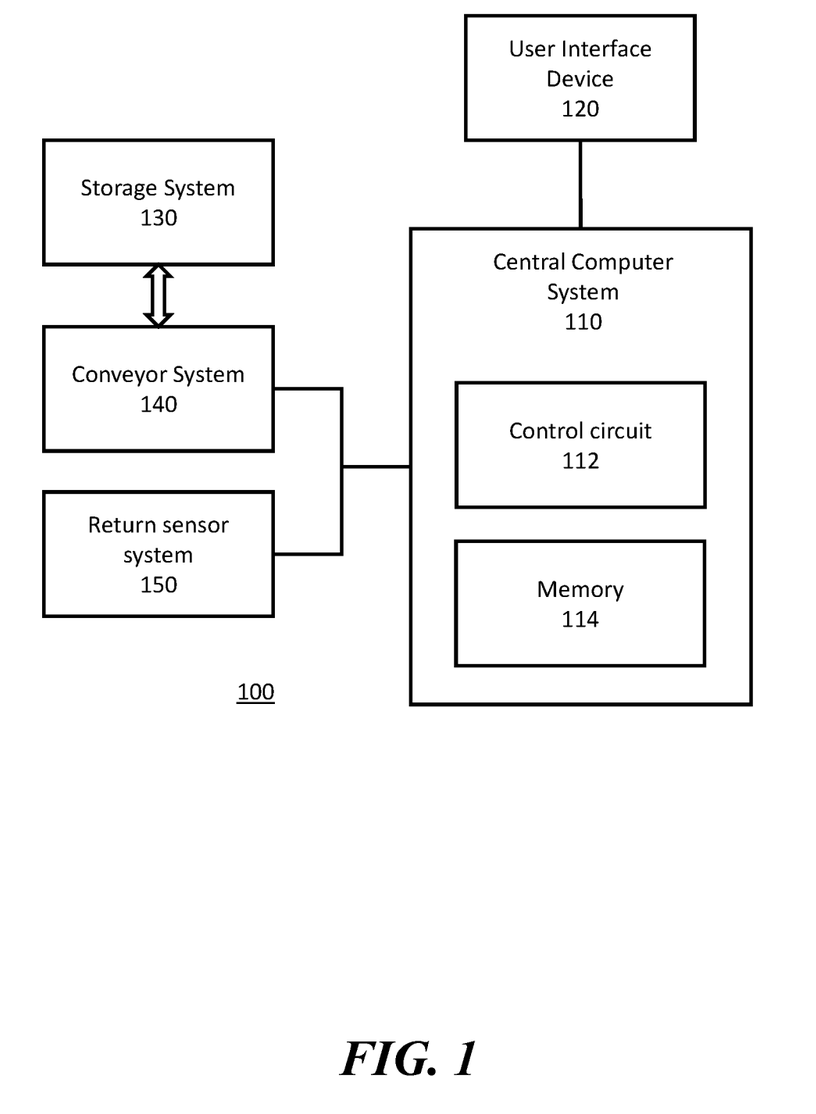
FIG. 1 comprises a block diagram of a system as configured in accordance with various embodiments of these teachings.

Referring now to FIG. 1, a system for store management is shown. The system 100 includes a central computer system 110, a user interface device 120, a storage system 130, a conveyor system 140, and a return sensor system 150. The system 100 may at least be partially located at a retail facility where customers make purchases. In some embodiments, the storage system 130 and the conveyor system 140 may be located in a backroom area of the retail facility comprising one or more of a storage and a consolidation areas.

The central computer system 110 comprises a control circuit 112 and a memory 114. The central computer system 110 may comprise one or more of a local computing system, a store management computer system, a remote server, a cloud-based server, and the like. The central computer system 110 may be configured to manage a retail facility comprising at least a backroom generally inaccessible to customers and an item interaction area. In some embodiments, the retail facility may further comprise a showroom area where one or more user interface devices 120 are located. In some embodiments, the retail facility may comprise a hybrid showroom and distribution center store format in which movements of items to and from the backroom area of the facility are automated. In some embodiments, the central computer system 110 may further be configured to manage other types of order fulfillment and delivery systems at the retail facility using the storage system 130. In some embodiments, the central computer system 110 may further be configured to fulfill pickup and/or delivery orders from the retail facility using the storage system 130 and the conveyor system 140.

The control circuit 112 may comprise a processor, a microprocessor, and the like and may be configured to execute computer readable instructions stored on a computer readable storage memory 114. The computer readable storage memory 114 may comprise volatile and/or non-volatile memory and have stored upon it, a set of computer readable instructions which, when executed by the control circuit 112, causes the central computer system 110 to fulfill item interaction requests received from the user interface device 120 with the conveyor system 140 and process returns with the return sensor system 150 and the conveyor system 140. In some embodiments, the computer executable instructions may cause the control circuit 112 of the central computer system 110 to perform one or more steps in the methods described with reference to FIGS. 2 and 4-5 herein.

The user interface device 120 may comprise a processor-based device configured to provide a shopping user interface that allows a customer to browse and select items offered for sale. In some embodiments, the user interface device 120 may comprise a display device such as one or more of a touchscreen display, a flat screen display, a projection display, an augmented reality display, a virtual reality display, a holographic projection, etc. In some embodiments, the user interface device 120 may comprise one or more user input devices such as a motion sensor, a camera, a microphone, a touch screen, a keypad, etc. In some embodiments, the user interface device 120 may comprise a network-connected device provided by the retail facility or belonging to a customer that is configured to communicate with the central computer system 110 to provide a virtual store user interface to the customer. In some embodiments, the user interface device 120 may be located inside or outside of the retail facility comprising the storage system and the conveyor system 140. In some embodiments, the user interface device 120 may comprise a virtual store kiosk in a showroom area of a retail facility that customers can use to explore a virtual store.

The user interface device 120 may comprise a graphical user interface (GUI) configured to display products to a user and receive user selections of products. In some embodiments, the GUI may comprise a virtual reality or augmented reality environment in which customers can walk around a virtual store and browse items displayed in the virtual store. In some embodiments, the central computer system 110 may be configured to cause the user interface device 120 to display representations of a plurality of items in a virtual reality or augmented reality environment to the customer for selection. For example, the GUI may provide a simulation of a sales floor with aisles and shelves and/or display products in a simulated environment such as a farm or an orchard. In some embodiments, the GUI may comprise a searchable and/or categorized list of products for user selection. In some embodiments, the GUI may comprise a software program such as one or more of a computer program, a mobile application, and/or an interactive web page. In some embodiments, the GUI is configured to allow customers to selects items to purchase and/or request items to interact with. For example, a customer may select items to add to a virtual shopping cart as they browse the virtual store and request to interact with one or more items in the virtual shopping cart through the GUI.

The storage system 130 may generally be configured to hold a plurality of items for storage in the backroom area of a retail facility. The storage system 130 may comprise one or more storage shelves, bins, cases, and the like. In some embodiments, the storage system 130 may comprise product sensors, such as optical sensors, for keeping track of items stored in the storage system 130. The item storage locations tracked by the storage system 130 may be communicated to the conveyor system 140 and/or the central computer system 110 to help the conveyor system 140 retrieve and aggregate items from the storage system 130. In some embodiments, the storage system 130 may comprise only storage structures, and item locations may be tracked by the conveyor system 140 and/or the central computer system 110.

The conveyor system 140 may comprise one or more item conveyor devices such as one or more of an automated conveyor system, conveyor belts, mechanical arms, motorized movable units, unmanned motored units, etc. for moving and consolidating items from the storage system 130. In some embodiments, the conveyor system 140 may comprise a processor-based computer system configured to convert instructions received from the central computer system 110 to instructions for one or more conveyor devices to locate and retrieve specific items. In some embodiments, the conveyor system 140 may be configured to consolidate two or more items selected by the customer prior to making the two or more items accessible to the customer in the item interaction area. In some embodiments, items may be consolidated into a container in the backroom area of the retail facility. The conveyor system 140 may further be configured to transfer items returned by customers back to the storage system 130 and/or other customers. In some embodiments, the conveyor system 140 may be configured to transport items from the storage system 130 to an item interaction area and back to the storage system 130 without human intervention. In some embodiments, the conveyor system 140 may further be configured to collect and consolidate items for other types of orders such as in-store pick-up orders and home delivery orders.

The return sensor system 150 may comprise one or more sensors configured to collect data from items returned by a customer. In some embodiments, the return sensor system 150 may be position in or over a return item receptacle accessible from an item interaction area of the retail facility. In some embodiments, the return sensor system 150 may comprise one or more of an x-ray imager, a sonar sensor, a video camera, a machine readable optical code scanner, an optical sensor, a Radio Frequency Identification (RFID) reader, a Near Field Communication (NFC) reader, a weight sensor, and the like. In some embodiments, the return sensor may be configured to collect data from products being sent out to the item interaction area to establish each product's baseline profile. A returned product may then be compared to the baseline profile to determine that the correct product is being returned and the returned product is in an acceptable condition. For example, the shape and the weight of a cereal box may be measured by the return sensor system 150 before the cereal box goes out to the item interaction area, and the returned cereal box's shape and weight may be checked to determine that the cereal has not been opened or damaged. In some embodiments, one or more characteristics of products (e.g. appearance, weight, shape, UPC, barcode, etc.) may be stored in a product database, and the data collected by the return sensor system 150 may be compared to the characteristics of the product in the product database to determine whether the returned product should be accepted. In some embodiments, data collected by the return sensor system 150 as products are going out may be used to update product characteristics in the product database. In some embodiments, the return sensor system 150 may further comprise one or more mechanical devices for moving, rotating, and/or lifting the returned item for inspection. For example, the return sensor system 150 may be configured to lift up and rotate a piece of garment to check for rips and stains.

In some embodiments, one or more of the user interface device 120, the storage system 130, the conveyor system 140, and the return sensor system 150 may comprise a processor-based control system comprising a control circuit configured to execute computer readable instructions stored on a memory. In some embodiments, the control system of one or more of the user interface device 120, the storage system 130, the conveyor system 140, and the return sensor system 150 may be at least partially implemented with the central computer system 110. In some embodiments, the central computer system 110 may further be coupled to a payment processing system for processing customer payments for one or more items via one or more of bank card payment, digital currency payment, cash payment, retailer credit system payment, and mobile payment. In some embodiments, the system may further include a product detection system in an item interaction area of the retail facility configured to detect whether a product has been carried out of the item interaction area. The system may be configured to charge the customer for any item carried out of the item interaction area as detected by the product detection system. In some embodiments, the product detection system may comprise one or more of a RFID sensor, a RFID tunnel, an optical sensor, a camera system, and the like. In some embodiments, if a system 100 receives an order that requests delivery to a remote location (e.g. customer's home, office, etc.), the central computer system 110 may instruct the conveyor system 140 and/or a delivery system to prepare the delivery order and/or forward the order a remote order fulfillment system to fulfill the order.

In some embodiments, one or more of the conveyor system 140, the return sensor system 150, and the central computer system 110 may further be coupled to one or more other databases such as an inventory database, a product storage location data, a product characteristic database, a customer profiles database, a virtual store map database, etc. for performing one or more functions described herein. In some embodiments, one or more components of the system 100 shown in FIG. 1 may communicate with another component via one or more of wired connections, wireless communication channels, a private network, a local network, a peer-to-peer network, and the Internet.

Figure 2:
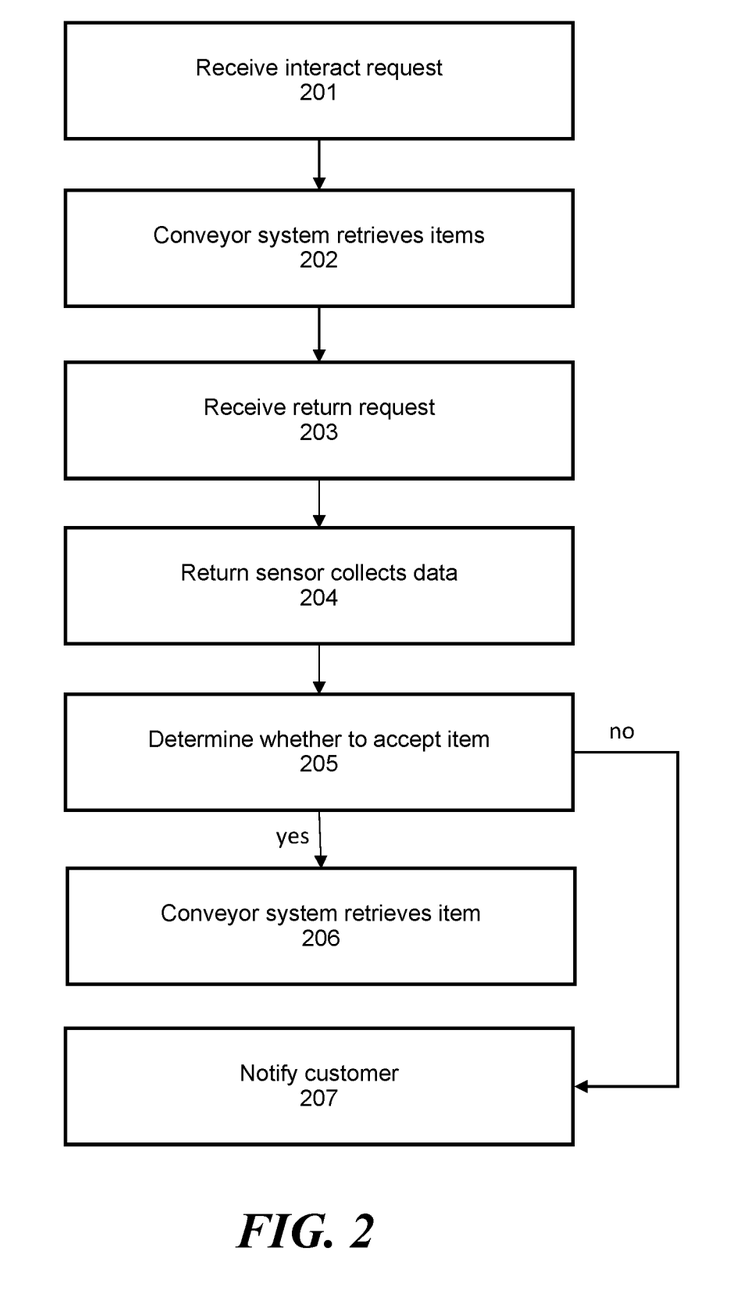
FIG. 2 comprises a flow diagram of a method as configured in accordance with various embodiments of these teachings.

Referring now to FIG. 2, a method for managing a store is shown. In some embodiments, the steps shown in FIG. 2 may be performed by a processor-based device such as the control circuit executing a set of computer readable instructions stored on a computer readable memory. In some embodiments, one or more steps of FIG. 2 may be performed by one or more of the control circuit 112 of the central computer system 110, a control circuit of the user interface device 120, and/or a control system of the conveyor system 140 described with reference to FIG. 1 herein.

In some embodiments, prior to step 201, the system may first provide a GUI to a user interface device that allows the user to browse and select items offered for sale. In some embodiments, the GUI may comprise a virtual reality or augmented reality environment in which customers can walk around a virtual store and browse items displayed in the virtual store. In some embodiments, the GUI may comprise representations of a plurality of items in a virtual reality environment to the customer for selection and virtual interaction. In some embodiments, the GUI may display a searchable and/or categorized list of products for user selection. In some embodiments, the GUI may be provided via a display device comprising one or more of a touchscreen display, a flat screen display, a projection display, an augmented reality display, a virtual reality display, a holographic projection, etc. In some embodiments, the GUI may be provided via a virtual store kiosk in a showroom area of a shopping space.

In step 201, the system receives an interact request from a customer. In some embodiments, the interact request may be received from a user interface device in a showroom area of the retail facility. In some embodiments, each interact request may comprise the selection of one or more products and a customer and/or session identifier. In some embodiments, a customer may add items in the virtual store to a try-out list and/or a virtual shopping cart to generate an interact request. In some embodiments, the customer may be given the option either directly add a product to the shopping cart for purchase or request to interact with the product before purchase. In some embodiments, the try-out option may be provided only for a subset of items in the virtual store. For example, the customer may request to interact with apparels or sporting goods before purchase but may not be given the option to try out dairy products such as egg and milk. In some embodiments, a product database may store try out restrictions for a plurality of items offered for sale.

In step 202, the system causes the conveyor system to retrieve items requested in step 201. In some embodiments, the conveyor system may comprise one or more item conveyor devices such as one or more of an automated conveyor system, conveyor belts, mechanical arms, motorized movable units, unmanned motored units, etc. for moving and consolidating items from a storage system. In some embodiments, the conveyor system may use item locations stored in an item location database to locate an item in a storage system. In some embodiments, the conveyor system may further be configured to remove individual items from a bulk packaging (e.g. a single soda bottle from a six-pack) to provide to customers. In some embodiments, the conveyor system may further consolidate two or more items selected by the customer prior to making the two or more items accessible to the customer in the item interaction area. In some embodiments, when a customer submits a interact request, a container or a conveyor belt slot may be assigned to the customer and the conveyor system may bring items selected by the customer to the container or the slot. In some embodiments, the conveyor system may deposited the item(s) in the item interaction area via one or more openings between the backroom area and the item interaction area. In some embodiments, the conveyor system may comprise a conveyor belt that run through the item interaction area configured to bring items to and from the item interaction area.

In some embodiments, the conveyor system may be configured to bring the items to a specific location within the item interaction location that has been associated with the customer that requested the items. For example, the customer may be assigned a window, a booth, a room, etc. in an item interaction area and the conveyor system may be configured to deposit the items retrieved for the customer into the assigned area. In some embodiments, the item interaction area may comprise one or more openings to the backroom area through which the conveyor system can deposit items. In some embodiments, the conveyor system may extend partially into the item interaction area. In some embodiments, when requests are received, the conveyor system may be configured to consolidate items requested by the customer over time and hold the consolidated items in the backroom. The items may then be deposited in the item interaction area when the customer indicates that he/she is ready to interact with the items.

After step 202, the customer may interact with the items provided by the conveyor system. For example, the customer may try on apparel, feel the material of bedding products, feel the weight and balance of sporting goods, smell packaged coffee, inspect the freshness of produce, etc. in the item interaction area. In some embodiments, the item interaction area may comprise one or more access controlled areas where only customers who have submitted an interact request are allowed into the item interaction area. In some embodiments, the customer may be provided a private area, such as a changing room, to interaction with the requested items. In some embodiments, the private item interaction areas may comprise one or more access controlled areas where only customers are required to verify their identity prior to entering a private item interaction area assigned to a customer.

After interacting with the items, the customer can decide to purchase the items or return them back to the system in the item interaction area. In some embodiments, the customer may pay for the requested item prior to entering the item interaction area and receive refunds for any item returned to the system in the item interaction area. In some embodiment, items that are not returned after a period of time (e.g. 30 minutes, 1 hour) may be charged to the customer. In some embodiments, the customer may only be charged for the requested products after they had a chance to interact with the products. In some embodiments, the customer may purchase items by carrying the items out of the item interaction area with them. For example, the item interaction area may comprise item sensors such as radio frequency identification (RFID) tag tunnel sensors, security tag sensors, and/or other types of sensors configured to detect customers and/or items leaving the item interaction area. In some embodiments, the customer may use a checkout terminal in the item interaction area or the showroom area of the shopping facility to purchase one or more items they received in the item interaction area. In some embodiments, the customer may user their mobile device to purchase one or more items. For example, a list of requested items may be displayed on a user interface on the mobile device, and the customer may select which items on the list they wish to return and which they wish to purchase and/or select a method of payment. In some embodiments, the system may be configured process one or more of bank card payment, digital currency payment, cash payment, retailer credit system payment, and mobile payment.

In step 203, the system receives a return request. In some embodiments, the return request may comprise a customer placing one or more items in a return receptacle. A sensor at the return receptacle may detect the presence of the item and trigger a return request at the system. In some embodiments, the return receptacle may comprise one or more of a window, a container, a slot, a chute, a bin, a platform, a conveyor belt, and the like. In some embodiments, the return receptacle may comprise the same apparatus through which the items are deposited in the item interaction area and provided to the customer. In some embodiments, the return receptacle may comprise a dedicated return receptacle. In some embodiments, the return request may be submitted by selecting and/or scanning the return item(s) via a user interface device such as a kiosk in the item interaction area, a personal mobile device, a point of sale system, etc.

In step 204, a return sensor system collects data from the item being returned by the customer. In some embodiments, the return sensor system may be position in or over a return item receptacle in an item interaction area of the retail facility and configured to check the conditions of items placed into the receptacle. In some embodiments, the return sensor system may comprise one or more of an x-ray imager, a sonar sensor, a video camera, a machine readable optical code scanner, an optical sensor, a Radio Frequency Identification (RFID) reader, a Near Field Communication (NFC) reader, a weight sensor, etc. In some embodiments, the return sensor may be configured to detect for conditions such as damage, stain, missing unit, missing part, broken seal, removed tag, change in weight, dent, tear, etc. in the returned item. In some embodiments, the return sensor system may further comprise one or more mechanical devices for moving, rotating, and/or lifting the returned item for inspection.

In step 205, the system determines whether to accept the item based on the data collected by the return sensor system. In some embodiments, the return sensor may be configured to collect data from products prior to the products goes out to the item interaction area to establish each product's baseline profile. The returned product may then be compared to the baseline profile associated with the product to verify that the correct product is being returned and the returned product is in an acceptable condition. In some embodiments, variously characteristics of products (e.g. appearance, weight, shape, UPC, barcode, etc.) may be stored in a product database. The data collected by the return sensor system may be compared to the characteristics of the product in the product database to determine whether the returned product should be accepted. For example, if a significant weight change or color change is detected, the product may be rejected for return. In some embodiments, the characteristics that are compared to determine product condition may differ based on the product's type, packaging, etc. For example, a change in the shape of a boxed cracker may cause the returned item to be reject but the shape of a bag of chips may not be considered in the assessment. In some embodiments, characteristics relevant for one or more items may be stored in a product database. In some embodiments, the system may first identify the product to determine the characteristics relevant to the product's condition based on the product database. In some embodiments, the system may selectively turn on one or more sensors in the sensor system based on the relevant characteristics of the identified product to inspect the product. In some embodiments, the system may accept the item returned by the customer if little or no change in item characteristics or condition is detected. In some embodiments, the system may accept the item if the deviation from the expected condition of the item falls within an acceptable threshold.

In step 206, if the system determines that the return item should be accepted, the conveyor system retrieves the item. In some embodiments, the conveyor system is configured to retrieve the item and makes the item available for another customer to request. In some embodiments, the conveyor system may be configured to return each item back to its original storage location from which the item was originally retrieved. For example, each item type may be associated with a storage location/section within the storage system, and the conveyor system may return items back to the associated storage location/section. In some embodiments, the conveyor system may be configured to return an item back to a bulk packing (e.g. a beer bottle back to a six-pack) and the item may be available as "eaches" and/or in bulk packing based on subsequent customer request. In some embodiments, the conveyor system may be configured to return the item to an available storage space and record the storage location of the item for subsequent retrieval. In some embodiments, the conveyor system may be configured to directly transfer a returned item from one customer to another customer who requested the same item without returning the item to the storage system. In some embodiments, the storage system may comprise a quick retrieval area close to the item interaction area. The conveyor may be configured to return frequently requested items to the quick retrieval area of the storage system. In some embodiments, the system may further credit the cost of return items back to the customer's method of payment in step 206. In some embodiments, the system may remove the return item from the customer's virtual shopping cart in step 206.

If the system determines that the return item should not be accepted, in step 207, the system may notify the customer. In some embodiments, the conveyor system may partially receive the return items for inspection in steps 204-205. If the return item is not accepted, the conveyor system may deposit the item back to the item interaction area or another item retrieval area. In some embodiments, the notification may be sent to a user interface device such as a kiosk, a mobile device, a display screen, etc. In some embodiments, the customer may be offered an option to speak to an associate about the return and a store associate may be notified to perform a secondary inspection of the returned item and determine whether to accept the return. In some embodiments, if a store associate determines that the item is in acceptable condition, the product database storing product characteristics may be updated. For example, the deviation tolerance for one or more characteristics associated with the product may be increased for subsequent determinations.

After steps 206 and/or 207, items requested by a customer and not returned may generally be charged to the customer. In some embodiments, the customer may carry items to a checkout terminal to purchase the items. In some embodiments, the customer may first register a method of payment and the system may be configured to process payment for items not returned to the system. In some embodiments, the system may determine that items are not being returned by detecting the customer and/or one or more items leaving the item interaction area of the shopping facility. In some embodiments, the system may determine that items are not being returned after a set period of time (e.g. 15 minutes, 30 minutes, etc.) has passed since the customer receive the requested items. In some embodiments, requested items may be charged to the customer when the interaction request is initially received and refunds may be issued for any returned item. In some embodiments, after step 202 or 203, the customer may be permitted to request additional items from the system. For example, the customer may request shoes of a different size, a different brand of exercise equipment, etc. via a user interface device. In some embodiments, additional items may be requested while the customer is in the item interaction area. In some embodiments, the system may limit the total number of items the user can have in the item interaction area at the time.

In some embodiments, the system may allow the customer to place one or more items on hold as the customer return to the showroom area to select additional items to request and/or purchase. In some embodiments, the system may allow the customer to return one or more items to the system to pick up later or have the items delivered to a customer address. In some embodiments, the customer may make a selection of an item receiving option and the system may cause at least one of the conveyor system and a delivery system to prepare items based on the item receiving option selected by the customer. In some embodiments, the conveyor system may be configured to transfer items from the item interaction area and/or storage area to one or more an on-hold area, an in-store pickup area, and a delivery preparation area based on customer request. In some embodiments, if the customer requests to place the item on hold, pick up the item later, and/or have the item delivered, the system may be configured to provide the exact item the customer at a later time or bring the item back to storage and provide a fungible item to the customer. In some embodiments, the return sensor system may perform similar inspections with items retrieved by the system to place on hold, stored for later pickup, and/or deliver. In some embodiments, the system may be configured to perform multiple instances of steps 201 for a plurality of customers.

Figure 3:
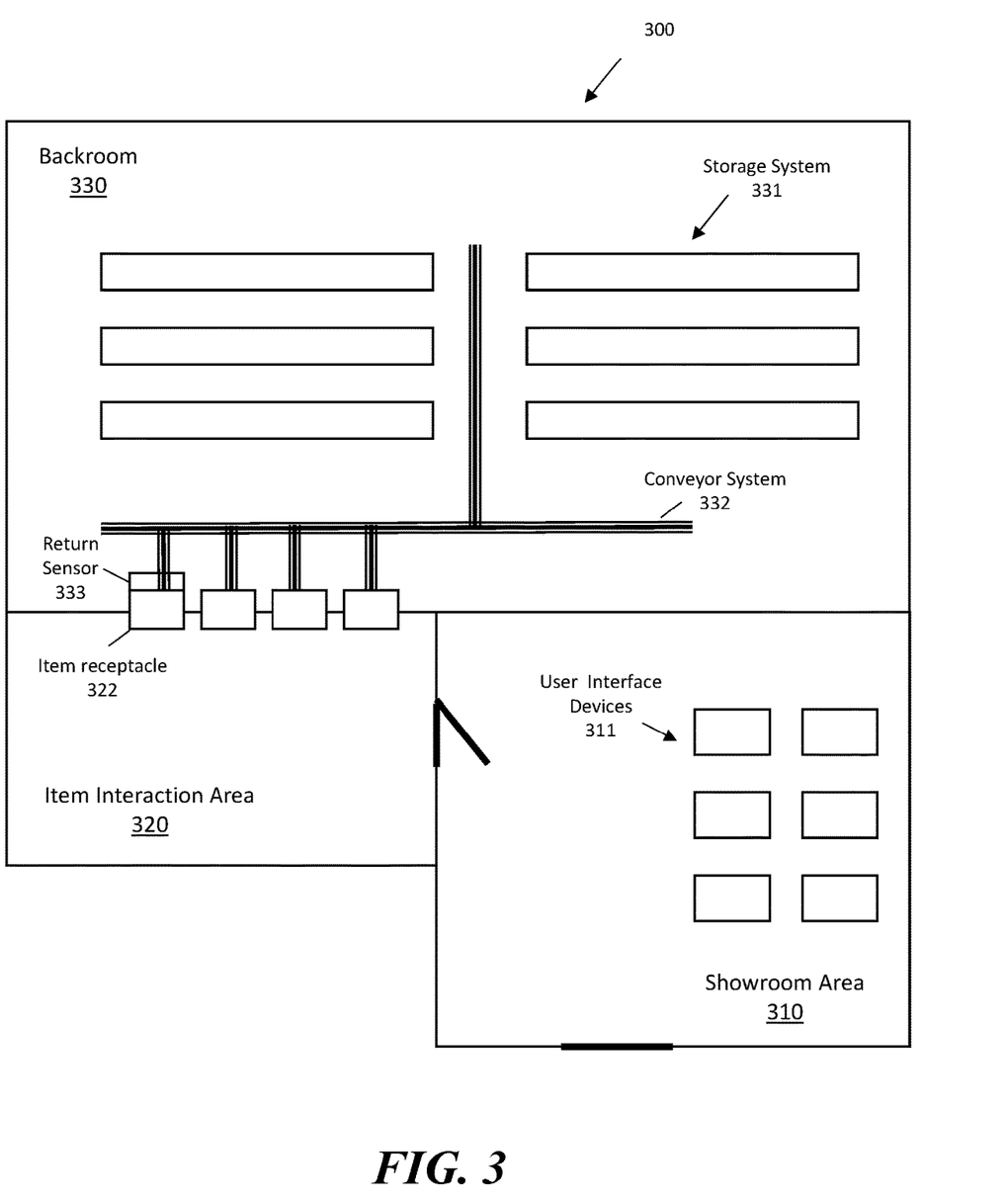
FIG. 3 comprises an illustration of a retail facility as configured in accordance with various embodiments of these teachings.

Referring now to FIG. 3, an illustration of a retail facility is shown. The retail facility 300 comprises a backroom 330, an item interaction area 320, and a showroom area 310. The backroom 330 may generally refer to an area that is generally inaccessible to customers of the retail facility 300. The backroom 330 may comprise a storage system 331 and a conveyor system 332. The storage system 331 may comprise storage apparatuses such as shelves, bins, boxes, etc. configured to store a plurality of items offered for sale at the retail facility. In some embodiments, the storage system 331 may further comprise a mechanical device such as dispenser and drop chutes for releasing items to the conveyor system 332. In some embodiments, the storage system 331 may comprise the storage system 130 described with reference to FIG. 1 or other similar systems.

The conveyor system 332 may comprise one or more item conveyor devices such as one or more of an automated conveyor system, conveyor belts, mechanical arms, and motorized movable units for moving and consolidating items from a storage system 331. In some embodiments, the conveyor system 332 may comprise sorters for consolidating items requested by customers in a consolidation area. In some embodiments, the conveyor system may be configured to route items from the storage system to the item interaction area 320. In some embodiments, the conveyor system may be configured to route items from the storage system to an item receptacle 322 assigned to a customer that requested the items. In some embodiments, the conveyor system 332 is configured to retrieve items from one or more item receptacles 322 and transport the items back to the storage system 331 or another item receptacle 322. In some embodiments, the conveyor system 332 may be configured to retrieve items from the item receptacle 322 and/or the storage system 331 and transfer the items to one or more of an item holding area and delivery preparation area. The configuration of the conveyor system 332 in FIG. 3 is shown as an illustration only. In some embodiment, a conveyor system 332 may comprise any number of segments, branches, and other types of conveyor devices. In some embodiments, the conveyor system 332 may comprise the conveyor system 140 described with reference to FIG. 1 or other similar systems.

The item interaction area 320 comprises an area accessible or conditionally accessible to customers of the retail facility 300. In some embodiments, the entrance to the item interaction area 320 may be configured to verify that the customer has placed an item interaction request before allowing the customer to enter the item interaction area 320. In some embodiments, the entrance to the item interaction area 320 be configured to allow customers to enter the item interaction area when their requested items have been or are about to be deposited in an item receptacle 322. The item receptacles 322 may generally comprise any apparatus configured to allow customers to access items transferred from the backroom 330 and/or return items to the backroom 330. In some embodiments, an item receptacle 322 may comprise one or more of a window, a container, a slot, a chute, a bin, a platform, a conveyor belt, and the like. In some embodiments, the item receptacles 322 may comprise an extended portion of the conveyor system 332. While multiple item receptacles 322 are shown, in some embodiments, item interaction area 320 may comprise a single receptacle and/or a conveyor belt that run through a portion of the item interaction area 320. In some embodiments, the item interaction area 320 may comprise a plurality of private areas such as fitting rooms, where customers may interact with one or more items in private. The item receptacles 322 may be positioned inside or outside of private areas of the item interaction area 320. In some embodiments, entrance to each private area may be accessed controlled. For example, a customer may be required to verify that they requested the items deposited in the private area by entering a code, scanning an ID, swiping a credit card, etc. to gain access to item interaction area and/or the private area. The conveyor system 332 may generally be configured to deposit and/or retrieve items through the item receptacles 322. In some embodiments, the item receptacle 322 may comprise a sensor for detecting that an item has been placed in the receptacle 322. The sensor may then trigger the conveyor system 332 and/or the return sensor 33 to perform inspection. In some embodiments, one or more item receptacles 322 may be a dedicated return receptacle or a dedicated deposit receptacle.

In some embodiments, one or more item receptacles 322 may be coupled to a return sensor 333. The return sensor 333 may generally comprise one or more sensors configured to collect data from items returned by a customer. While the return sensor 333 is shown to be positioned in the backroom 330, in some embodiments, the return sensor 333 may be positioned in the item interaction area 320 or at a different location in the backroom 330. For example, the conveyor system 332 may be configured to bring returned items to a central inspection area comprising the return sensor 333 and send items not accepted for return back the item interaction area 320 or another item pickup location. While the return sensor 333 is shown to be coupled with one item receptacles 322 in FIG. 3, in some embodiments, return sensors 333 may be coupled to some of all of the remaining item receptacles 322. In some embodiments, the return sensor 333 may comprise one or more of an x-ray imager, a sonar sensor, a video camera, a machine readable optical code scanner, an optical sensor, a Radio Frequency Identification (RFID) reader, a Near Field Communication (NFC) reader, and a weight sensor. In some embodiments, the return sensor 333 may comprise the return sensor system 150 described with reference to FIG. 1 or other similar systems.

The showroom area 310 may comprise an area generally accessible to customers in a retail facility. In some embodiments, the showroom area 310 may comprise a number of user interface devices 311. The user interface device 311 may comprise a processor-based device configured to allow a customer to browse and select items offered for sale. In some embodiments, each user interface device 311 may comprise a display device comprising one or more of a touchscreen display, a flat screen display, a projection display, an augmented reality display, a virtual reality display, a holographic projection, etc. In some embodiments, a user interface device 311 may comprise one or more user input devices such as a motion sensor, a camera, a microphone, a touch screen, a keypad, etc. In some embodiments, one or more user interface devices 311 may comprise a virtual store kiosk that customers can use to interact with a virtual store. In some embodiments, the showroom area 310 may include some of no physical items for sale. In some embodiments, one or more user interface device 311 may comprise a device brought into the store by a user. For example, a virtual store may be displayed via a user's augmented reality head mounted display. In some embodiments, the showroom area 310 may be optional to the retail facility and customers may select items at a remote location and then arrive at the retail facility to interact with the requested item in the item interaction area 320. In some embodiments, the showroom area 310 may be merged with the item interaction area 320. For example, a virtual store booth may also serve as an item interaction area 320 where customers can receive items from the conveyor system 332 and return unwanted items to the conveyor system 332 while in the booth.

The layout of the retail facility 300 shown in FIG. 3 is provided as an example only. The proportions and arrangements of the areas, systems, and devices can generally be varied in a number of ways without departing from the spirit of the present disclosure.

Figure 4:
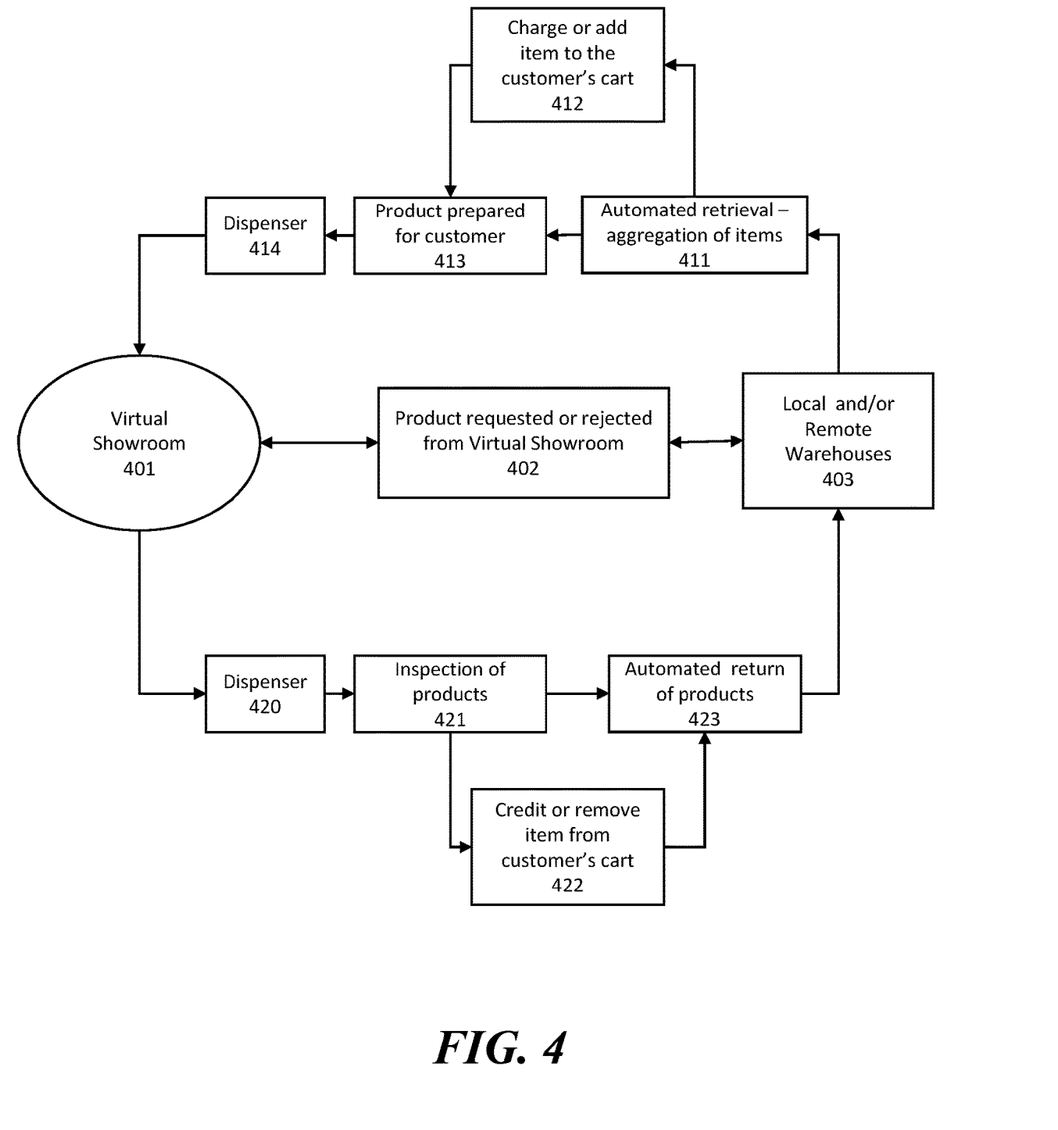
FIG. 4 comprises a flow diagram as configured in accordance with various embodiments of these teachings.

Referring now to FIG. 4, a flow diagram of a request and return process is shown. In some embodiments, the steps shown in FIG. 4 may be performed by a processor-based device such as the control circuit executing a set of computer readable instructions stored on a computer readable memory. In some embodiments, one or more steps of FIG. 4 may be performed by one or more of the control circuit 112 of the central computer system 110, a control circuit of the user interface device 120, and/or a control system of the conveyor system 140 described with reference to FIG. 1 herein.

From the virtual showroom 401, a customer may request or reject a product in step 402. The request or rejection may be communicated a local and/or a remote warehouse 403. For an item request, items are retrieved and aggregated by an automated system in step 411. In step 412, the customer is charged for the requested item and/or the requested item is added to the customer's virtual shopping cart. In step 413, the system prepares the requested products for the customer and the products are sent to the customer in the virtual showroom 401 via a dispenser 414.

For a rejected item, the customer places an item in a dispenser 420. The dispenser 420 may comprise a dedicated return dispenser or the same dispenser as dispenser 414. In step 421, a rejected product is inspected by the system with return sensors. In step 422, the customer's account is credited for the returned item and/or the item is removed from the customer's virtual cart. In step 423, the automated system returns the products back to the local and/or remote warehouses 403. In some embodiments, the same automated item conveyor system may perform one or more of steps 411, 413, and 423.

Figure 5:
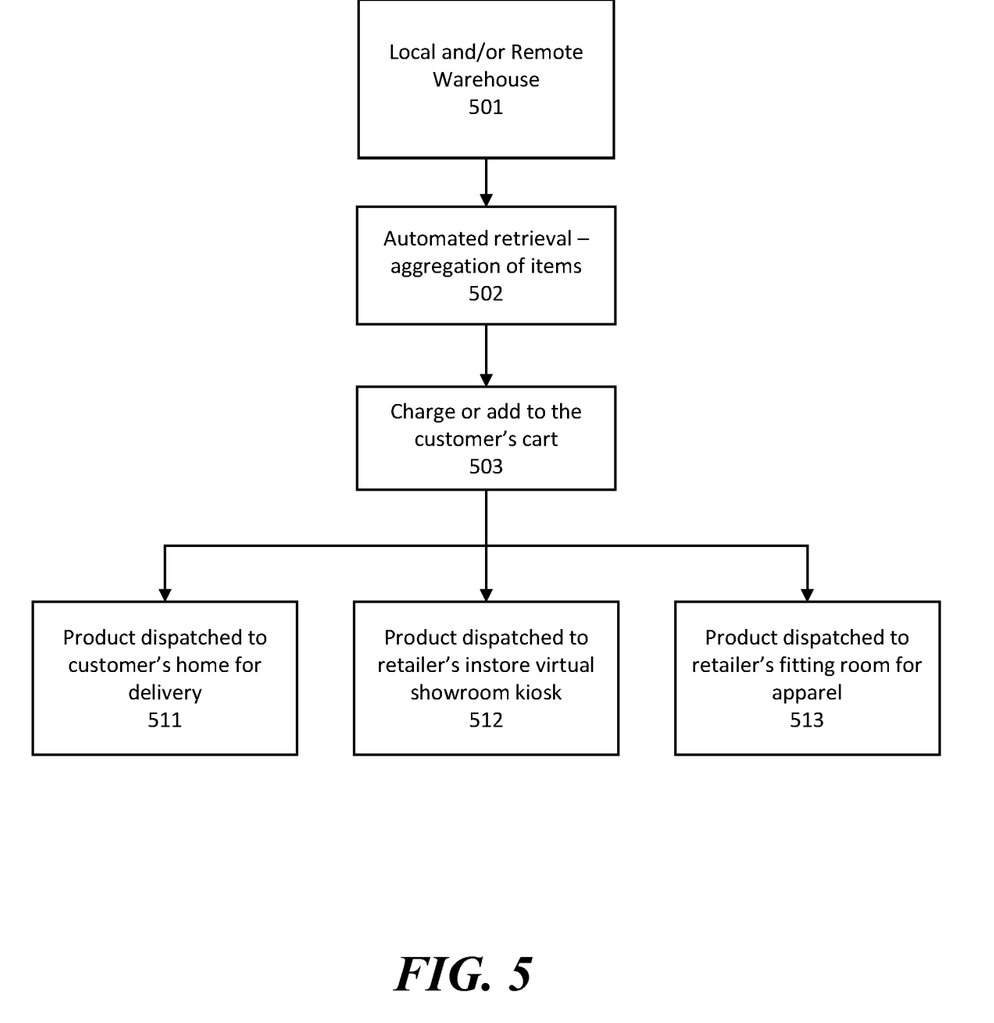
FIG. 5 comprises a flow diagram as configured in accordance with various embodiments of these teachings.

Referring now to FIG. 5, a flow diagram of processing purchases is shown. In some embodiments, the steps shown in FIG. 5 may be performed by a processor-based device such as the control circuit executing a set of computer readable instructions stored on a computer readable memory. In some embodiments, one or more steps of FIG. 5 may be performed by one or more of the control circuit 112 of the central computer system 110, a control circuit of the user interface device 120, and/or a control system of the conveyor system 140 described with reference to FIG. 1 herein.

In step 502, an automated retrieval-aggregation system retrieves items from a local and/or a remote warehouse 501 in response to a customer's request. In step 503, the requested items are charged to the customer and/or added to the customer's virtual shopping cart. In some embodiments, customers may be offered delivery options for one or more items requested. In some embodiments, a customer may request to the items delivered to them, request to receive items in the showroom area of the retail facility, and/or request to interact with the items before purchase. Based on customer's selection, the system may dispatch products to the customer's home for delivery in step 511, dispatch products to a retailer's instore virtual showroom kiosk in step 512, and/or dispatch apparel to retailer's fitting room in step 513. In some embodiments, an item conveyor system may be configured to retrieve and route items to different areas of a retail facility based on customer request to perform steps 511, 512, and 513. In some embodiments, items delivered to a customer at home and/or at an in-store kiosk may also be returned via the automated return system described herein at a later time.

In some embodiments, a virtual showroom is provided that also provides a medium for customers to interact with physical items for sale. The virtual store system may support physical and/or virtual fitting rooms that allow the customers to try on apparel items before a purchase is made. In some embodiments, a virtual fitting room may include a representation of the customer that mimics the customer's physical appearance and measurements. In some embodiments, the virtual showroom may provide an interactive virtual environment via display devices such as one or more of holographic display, virtual reality display, touch screen, and smart devices.

In some embodiments, a virtual showroom may be coupled to a system configured to perform automated products retrieval and return. The system may automate warehouse retrieval based on customer requests received through one of the virtual showrooms mediums. The warehouse may be configured to send product requested by the customer to an automation retrieval system, where bulked packed items may be separated and items may be consolidated with other individual units for the customer. After consolidation, the products may be prepared for the customer and dispatched to a dispenser from which the customer can retrieve the product. If a customer requests to return a product, the return quest may be sent to the warehouse. In some embodiment, the customer may return a product by placing the product in a return dispenser. The system may inspect the returned product with one or more of: X-ray, sonar, video/visual analytics, bar code scanning, UPC scanning, etc. If a returned product is accepted, credit may be issued to the customer's method of payment and/or the item may be is removed from the customer's virtual shopping cart. Returned products may be transferred back to the warehouse for storage. In some embodiments, a returned product may be reassembled into a bulk item and subsequently be used to fill an order for a bulk item.

In some embodiments, if the customer prefers home delivery instead of taking the product with them, the customer may be provided the options to request delivery of the product to their preferred location. In some embodiments, delivery options may include sending the product to one or more of customer's home, a retailer's instore virtual showroom kiosk, a customer selected retail location, a customer selected pickup location, and a retailer's fitting room. In some embodiments, the system may further be configured to process payments made via one or more of credit card, digital currency (e.g. BitCoin), cash, and retailer credit system.

In one embodiment, a system for store management comprises: a storage system in a backroom area of a retail facility configured to store a plurality of items for sale, a conveyor system configured to transport items from the storage system to an item interaction area in the retail facility, a return sensor system, and a control circuit coupled to the conveyor system and the return sensor system, the control circuit being configured to: receive an interact request from a customer via a user interface device in a showroom area of the retail facility, cause the conveyor system to retrieve one or more items from the storage system and transport the one or more items to the item interaction area based on the interact request, receive a return request for at least one item from the customer, cause the return sensor system to collect data from the at least one item, determine whether to accept the return request based on the data collected by the return sensor system, and in an event that the return request is accepted, cause the conveyor system to retrieve the at least one item from the customer and make the at least one item available for another customer.

In one embodiment, a method for store management comprises: receiving, at a control circuit, an interact request from a customer via a user interface device in a showroom area of a retail facility, causing a conveyor system to retrieve one or more items from a storage system in a backroom area of the retail facility and transport the one or more items to an item interaction area based on the interact request, receiving, at the control circuit, a return request for at least one item from the customer, causing a return sensor system to collect data from the at least one item, determining, with the control circuit, whether to accept the return request based on the data collected by the return sensor system, and in an event that the return request is accepted, causing the conveyor system to retrieve the at least one item from the customer and make the at least one item available for another customer.

In one embodiment, an apparatus for store management comprising: a non-transitory storage medium storing a set of computer readable instructions, and a control circuit configured to execute the set of computer readable instructions which causes to the control circuit to: receive an interact request from a customer via a user interface device in a showroom area of a retail facility, cause a conveyor system to retrieve one or more items from a storage system in a backroom area of the retail facility and transport the one or more items to an item interaction area based on the interact request, receive a return request for at least one item from the customer, cause a return sensor system to collect data from the at least one item, determine whether to accept the return request based on the data collected by the return sensor system, and in an event that the return request is accepted, cause the conveyor system to retrieve the at least one item from the customer and make the at least one item available for another customer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for store management comprising:
a storage system in a backroom area of a retail facility configured to store a plurality of items for sale;
a conveyor system configured to transport items from the storage system to an item interaction area in the retail facility;
an item sensor associated with the item interaction area;
a return sensor system; and
a control circuit coupled to the conveyor system and the return sensor system, the control circuit being configured to:
   receive an interact request from a customer via a user interface device in a showroom area of the retail facility;
   cause the conveyor system to retrieve one or more items from the storage system and transport the one or more items to the item interaction area based on the interact request;
   receive a return request for at least one item from the customer;
   cause the return sensor system to collect data from the at least one item;

determine whether to accept the return request based on the data collected by the return sensor system;

in an event that the return request is accepted, cause the conveyor system to retrieve the at least one item from the customer and make the at least one item available for another customer; and process a payment for at least some the one or more items in response to the item sensor detecting the customer leaving the item interaction area with the at least some of the one or more items.

2. The system of claim 1, wherein the return sensor system comprises one or more of a x-ray imager, a sonar sensor, a video camera, a machine readable optical code scanner, an optical sensor, a Radio Frequency Identification (RFID) reader, a Near Field Communication (NFC) reader, and a weight sensor.

3. The system of claim 1, wherein the return request comprises the customer placing the at least one item in a return item receptacle accessible from the item interaction area.

4. The system of claim 1, wherein the conveyor system is configured to:

transport the at least one item retrieved from the customer to a section of the backroom area; and record the section as a location of the at least one item for subsequent retrieval.

5. The system of claim 1, wherein the user interface device comprises a virtual reality display and the control circuit is further configured to cause the user interface device to display representations of a plurality of items in a virtual reality environment to the customer for selection.

6. The system of claim 1, wherein the showroom area, the backroom area, and the item interaction area each comprises a separate area of the retail facility.

7. The system of claim 1, wherein the control circuit is further configured to:

cause the conveyor system to consolidate two or more items selected by the customer prior to making the two or more items accessible to the customer in the item interaction area.

8. The system of claim 1, wherein the control circuit is further configured to process a payment for at least some of the one or more items via one or more of bank card payment, digital currency payment, cash payment, retailer credit system payment, and mobile payment.

9. The system of claim 1, wherein the control circuit is further configured to:

receive a selection of an item receiving option from the customer; and cause at least one of the conveyor system and a delivery system to prepare at least some of the one or more items based on the item receiving option selected by the customer.

10. A method for store management comprises:

receiving, at a control circuit, an interact request from a customer via a user interface device in a showroom area of a retail facility;

causing a conveyor system to retrieve one or more items from a storage system in a backroom area of the retail facility and transport the one or more items to an item interaction area based on the interact request;

receiving, at the control circuit, a return request for at least one item from the customer;

causing a return sensor system to collect data from the at least one item;

determining, with the control circuit, whether to accept the return request based on the data collected by the return sensor system; and in an event that the return request is accepted, causing the conveyor system to retrieve the at least one item from the customer and make the at least one item available for another customer; and processing a payment for at least some the one or more items in response to an item sensor associated with the item interaction area detecting the customer leaving the item interaction area with the at least some of the one or more items.

11. The method of claim 10, wherein the return sensor system comprises one or more of a x-ray imager, a sonar sensor, a video camera, a machine readable optical code scanner, an optical sensor, a Radio Frequency Identification (RFID) reader, a Near Field Communication (NFC) reader, and a weight sensor.

12. The method of claim 10, wherein the return request comprises the customer placing the at least one item in a return item receptacle accessible from the item interaction area.

13. The method of claim 10, wherein the conveyor system is configured to:

transport the at least one item retrieved from the customer to a section of the backroom area; and record the section as a location of the at least one item for subsequent retrieval.

14. The method of claim 10, wherein the user interface device comprises a virtual reality display and the control circuit is further configured to cause the user interface device to display representations of a plurality of items in a virtual reality environment to the customer for selection.

15. The method of claim 10, wherein the showroom area, the backroom area, and the item interaction area each comprises a separate area of the retail facility.

16. The method of claim 10, further comprising:

causing the conveyor system to consolidate two or more items selected by the customer prior to making the two or more items accessible to the customer in the item interaction area.

17. The method of claim 10, further comprising:

processing a payment for at least some of the one or more items via one or more of bank card payment, digital currency payment, cash payment, retailer credit system payment, and mobile payment.

18. The method of claim 10, wherein the control circuit is further configured to:

receive a selection of an item receiving option from the customer; and cause at least one of the conveyor system and a delivery system to prepare at least some of the one or more items based on the item receiving option selected by the customer.

19. An apparatus for store management comprising:

a non-transitory storage medium storing a set of computer readable instructions; and a control circuit configured to execute the set of computer readable instructions which causes to the control circuit to:

receive an interact request from a customer via a user interface device in a showroom area of a retail facility;

cause a conveyor system to retrieve one or more items from a storage system in a backroom area of the retail facility and transport the one or more items to an item interaction area based on the interact request;

receive a return request for at least one item from the customer;
cause a return sensor system to collect data from the at least one item;
determine whether to accept the return request based on the data collected by the return sensor system; and
in an event that the return request is accepted, cause the conveyor system to retrieve the at least one item from the customer and make the at least one item available for another customer;
process a payment for at least some the one or more items in response to an item sensor associated with the item interaction area detecting the customer leaving the item interaction area with the at least some of the one or more items.

* * * * *

UNITED STATES PATENT AND TRADEMARK OFFICE
CERTIFICATE OF CORRECTION

PATENT NO. : 10,600,100 B2
APPLICATION NO. : 15/698092
DATED : March 24, 2020
INVENTOR(S) : Todd D. Mattingly et al.

Page 1 of 1

It is certified that error appears in the above-identified patent and that said Letters Patent is hereby corrected as shown below:

In the Claims

Claim 1, Column 15, Line 7, after "some" insert --of--.
Claim 10, Column 16, Line 8, after "some" insert --of--.
Claim 19, Column 17, Line 11, after "some" insert --of--.

Signed and Sealed this
Eleventh Day of August, 2020

Andrei Iancu
*Director of the United States Patent and Trademark Office*